United States Patent [19]
Wedertz et al.

[11] 4,398,797
[45] Aug. 16, 1983

[54] ECCENTRIC FIBER OPTIC ADJUSTABLE HOLDER

[75] Inventors: Larry D. Wedertz, Mira Loma; Oakley G. Ross, Upland, both of Calif.

[73] Assignee: General Dynamics, Pomona Division, Pomona, Calif.

[21] Appl. No.: 244,416

[22] Filed: Mar. 16, 1981

[51] Int. Cl.³ .................................................. G02B 7/26
[52] U.S. Cl. ................................................... 350/96.21
[58] Field of Search ................. 350/96.20, 96.21, 96.22

[56] References Cited

U.S. PATENT DOCUMENTS

| | | | |
|---|---|---|---|
| 3,800,388 | 4/1974 | Börner et al. | 29/200 P |
| 3,922,064 | 11/1975 | Clark et al. | 350/96.22 |
| 3,936,143 | 2/1976 | Sato | 350/96.21 |
| 3,999,841 | 12/1976 | Dakss et al. | 350/320 |
| 4,019,806 | 4/1977 | Fellows et al. | 350/96.21 |
| 4,146,300 | 3/1979 | Kaiser | 350/96.21 |
| 4,147,405 | 4/1979 | Spainhour | 350/96.21 |
| 4,205,896 | 6/1980 | Borsuk | 350/96.20 |
| 4,239,333 | 12/1980 | Dakss et al. | 350/96.21 |
| 4,289,374 | 9/1981 | Franken et al. | 350/96.20 |

FOREIGN PATENT DOCUMENTS

| | | | |
|---|---|---|---|
| 2358785 | 6/1975 | Fed. Rep. of Germany | |
| 2643771 | 3/1978 | Fed. Rep. of Germany | 350/96.21 |
| 52-9451 | 1/1977 | Japan | 350/96.21 |
| 55-133583 | 10/1980 | Japan | 350/96.20 |

OTHER PUBLICATIONS

Henderson et al., 27th Electronics Components Conference, Arlington, VA, U.S.A. (May 16-18 1977), "A Fiber Optic Rotational Coupler," pp. 557-560.
S. Zemon, D. Fellows, and P. Sturk, "Eccentric Coupler for Optical Fibers: a Simplified Version", Applied Optics, vol. 14, No. 4, Apr. 1975, pp. 815-816.

*Primary Examiner*—John D. Lee
*Assistant Examiner*—Frank Gonzalez
*Attorney, Agent, or Firm*—Henry M. Bissell; Edward B. Johnson

[57] ABSTRACT

Apparatus for holding an optical fiber, having both longitudinal and radial adjustment capabilities. The fiber is disposed in a tubular member having an end disc which secures one end of the fiber in an eccentric hole therein. The tubular member is disposed in an eccentric hole of a threaded collet. Relative rotation of the collet with respect to the end disc provides for radial adjustment of the end of the optical fiber. Axial motion of the tubular member within the collet provides for longitudinal adjustment of the fiber. A tapered nut provides for locking capability of the tubular member with respect to the collet. A particular embodiment of the present invention provides a means by which the optical fiber may be adjusted with respect to an optical system to allow optical energy to be focused on the end of the fiber.

21 Claims, 6 Drawing Figures

ECCENTRIC FIBER OPTIC ADJUSTABLE HOLDER

BACKGROUND OF THE INVENTION

1. Field of the Invention

The present invention relates generally to fiber optic couplers and, more more particularly, to optical fiber holders which provide for both radial and longitudinal adjustment capabilities.

2. Description of the Prior Art

Heretofore, numerous devices have been designed which allow for the alignment and coupling of one or more optical fiber waveguides. Representative of this class of devices are U.S. Pat. No. 3,800,388 to Borner et al, U.S. Pat. No. 3,922,064 to Clark et al, U.S. Pat. No. 3,936,143 to Sato, U.S. Pat. No. 3,999,841 to Dakss et al, U.S. Pat. No. 4,146,300 to Kaiser, U.S. Pat. No. 4,147,405 to Spainhour, and U.S. Pat. No. 4,205,896 to Borsuk. The inventions in the above-identified patents are designed to axially align one or more waveguides which are butt-coupled together. Alignment of the waveguides is typically accomplished by either linear motion or the rotation of eccentric elements.

However, no prior art device is known which provides for a holder of a fiber allowing for both radial and longitudinal adjustment of the waveguide. In particular, no device has been found which allows for the end of an optical fiber to be axially and radially adjusted so as to allow light to be focused onto one end thereof.

SUMMARY OF THE INVENTION

The present invention thus provides for a holder for an optical fiber having both radial and longitudinal adjustment capabilities. The radial adjustment is accomplished by rotating a pair of eccentric elements, one of which is a threaded collet while the other is an end disc, both of which have eccentric holes therein. Longitudinal adjustment is accomplished by loosening a tapered nut connected to the threaded collet, such that a tubular holder containing the optical fiber is free to move longitudinally.

More particularly, a fiber-optic waveguide holder is provided which comprises an end disc having an eccentric hole therein into which is disposed one end of the waveguide. A tubular member has the end disc disposed into one end thereof and has the waveguide extending therethrough. A threaded collet is provided with an insert which has an eccentric hole disposed therein into which the tubular member is disposed. A tapered nut threads onto the collet and secures the tubular member in a fixed position relative to the collet. Longitudinal motion of the waveguide is accomplished by loosening the tapered nut and sliding the tubular member axially through the collet. Radial adjustment of the waveguide is accomplished by relative rotation of the end disc and the insert of the collet.

One specific embodiment of the present invention provides for the use of the present invention in an optical system wherein light energy is focused onto the end of the waveguide. The above-described holder is used in conjunction with an optical system which comprises an optic housing into which the waveguide holder is disposed and secured. Adjustment of the axial and radial position of the end of the waveguide allows for proper focusing of light energy onto the end of the waveguide by the optical system. Rotational motion of the holder is accomplished by the use of jam nuts which secure the holder to the optic housing, while longitudinal motion of the waveguide is secured by means of the tapered nut.

BRIEF DESCRIPTION OF THE DRAWINGS

A better understanding of the present invention may be had from a consideration of the following detailed description, taken in conjunction with the accompanying drawings in which.

DETAILED DESCRIPTION OF THE PREFERRED EMBODIMENT

Figure 1:
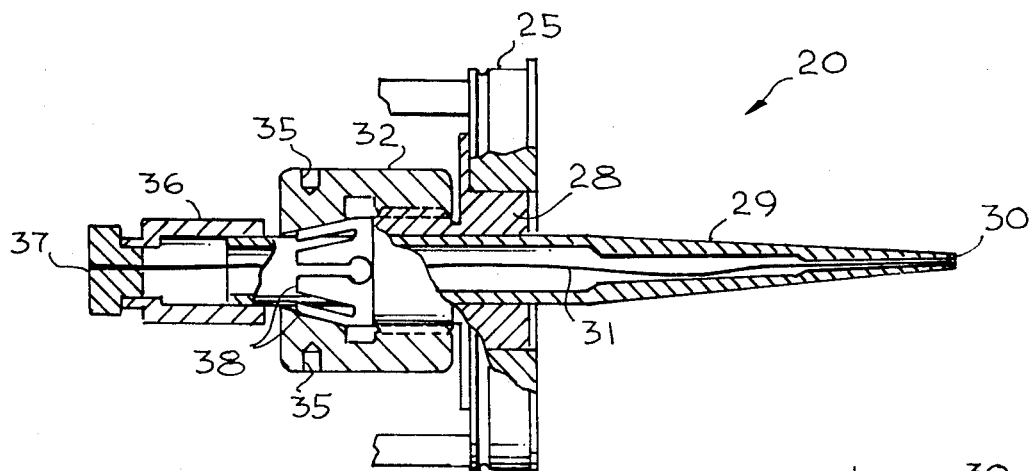
FIG. 1 shows a cross-sectional view of a waveguide holder in accordance with the present invention.

Referring to FIG. 1, there is shown a cross-sectional view of a fiber optic waveguide holder in accordance with the present invention. The waveguide holder 20 generally comprises a collet 25, including a threaded insert 28 which has an eccentric hole disposed therein relative to the center line of the collet 25. A tubular member 29, having a section of generally constant cross-section and a section of tapering cross-section, is disposed in the eccentric hole of the collet 25 in the constant cross-section area. An end disc 30 having an eccentric hole therein is disposed at the end of the tapered section of the tubular member 29. A fiber optic waveguide 31 has one end thereof disposed in the eccentric hole of the end disc 30 and extends through the tubular member 29 and to the other end thereof.

A tapered nut 32 is provided which is adapted to thread onto the threaded collet 25 and which tightens a plurality of clamping members 38 around the periphery of the tubular member 29. The tubular member 29 is secured in place when the nut 32 is tightened. A plurality of holes 35 are disposed in the outer periphery of the nut 32 in order to accommodate insertion of a spanner wrench, or the like, to tighten and untighten the nut 32. A spacer 36 having a second end disc 37 disposed in one end thereof is attached to the other end of the tubular member 29. The second end disc has a hole therein which is suitable to allow the other end of the fiber 31 to be disposed therein.

Figure 2:
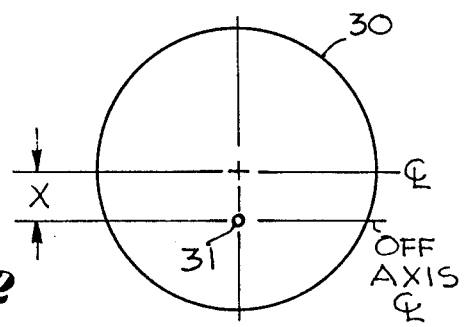
FIG. 2 shows an end view of the end disc including the relative position of the fiber disposed therein.
Figure 3A:
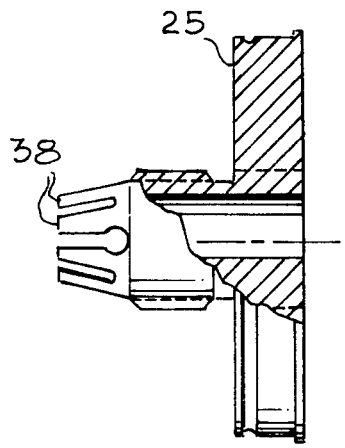
FIGS. 3A and 3B show a detailed view of the collet.
Figure 3B:
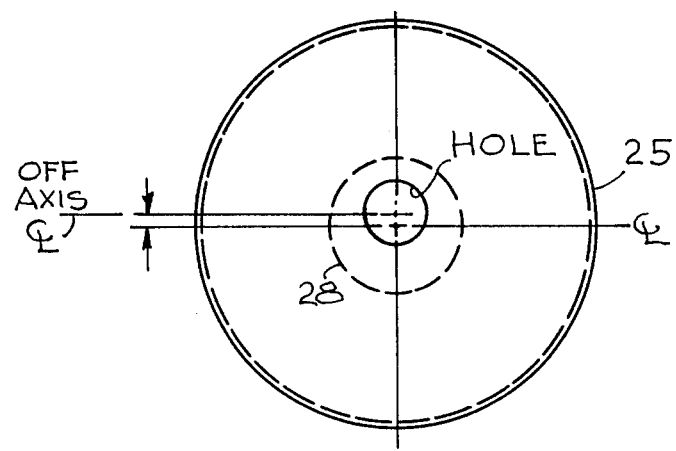
Figure 4:
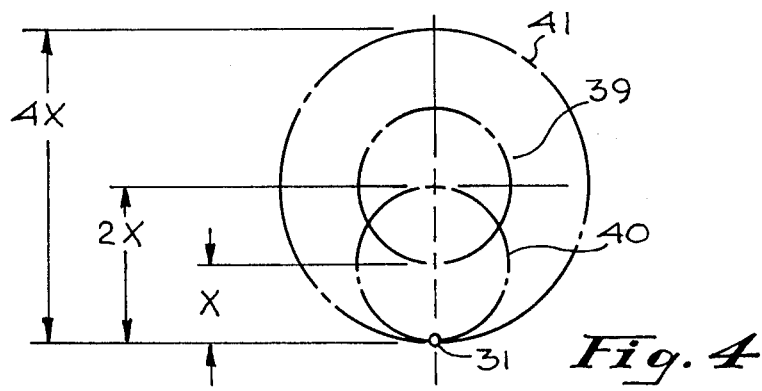
FIG. 4 shows the radial adjustment capability of the holder of the present invention.

The radial adjustment capability of the holder of FIG. 1 may be more readily understood with reference to FIGS. 2–4. FIG. 2 shows the end disc 30 and the position of the fiber or waveguide 31 disposed therein. As is noted in FIG. 2 the waveguide is positioned a distance X off the center line of the disc. FIG. 3B shows the collet 25 and in particular the position of the eccentric hole in the insert 28 of the collet 25, with reference to the center line of the collet. As is noted, the center line of the eccentric hole is positioned a distance X off the center line of the collet.

FIG. 4, shows the radial adjustment capability of the holder 20 of the present invention. The relative position of the center line of the tubular member 29 is shown by the dashed circle marked 39, while the relative motion of the fiber 31 is shown by the circle marked 40. Accordingly the combined rotational capability of the holder 20 is given by the circle identified as 41 within which the waveguide 31 may be positioned with reference to the center line of the holder 20. Referring again to FIG. 1, the longitudinal adjustment of the waveguide 31 is accomplished by sliding the tubular member 29 axially through the collet 25. Once the proper axial position of the ends of the waveguide 31 is achieved, disc position may be secured by tightening the tapered nut 32, thus forcing the resilient fingers 38 into frictional engagement with the surface of the member 29.

Figure 5:
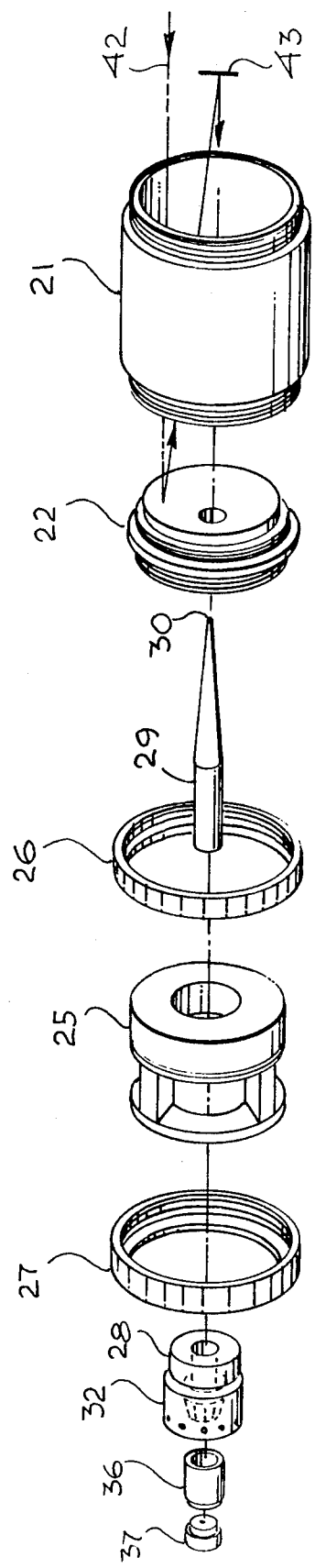
FIG. 5 is an exploded view of a specific embodiment of the present invention.

Referring now to FIG. 5, there is shown an exploded view of the holder of the present invention used in conjunction with a portion of an optical system (not shown). The drawing of FIG. 5 shows the general components of the holder 20 as hereinabove described, but in addition further comprises an optic housing 21 into which is secured an optical dish assembly 22. The optical dish assembly 22 has a hole through its center through which the tubular member 29 may pass. First and second jam nuts 26, 27 are disposed on either side of the collet 25 and are utilized to secure the collet 25 to the optical dish assembly 22. At the right of FIG. 5 there is shown focused light energy 42 which is reflected onto a secondary mirror 43 near the center line of the holder 20. The foused light energy 42 is then reflected off this secondary mirror onto the end disc 30 and the relative position of the fiber optic waveguide 31 may be positioned so that the light energy 42 is focused on the end of the waveguide 31.

One advantage of the present invention is that a crude alignment of the fiber optic waveguide 31 may be accomplished at a workbench, while the fine adjustment may be made after final assembly of the optical system. The holes 35 in the tapered nut 32 provide a means which allows a tool, such as a spanner wrench, or the like, to lock or unlock the tubular member 29 for radial and longitudinal hand adjustment. When the tapered nut 32 is unlocked longitudinal and rotational motion of the tubular member 29 may be accomplished, thus allowing for proper positioning of the end disc 30. If the jam nut 27 is backed off, thus unlocking the collet 25, the insert 28 may be rotated relative to the center line of the holder 20, thus allowing for positioning of the tubular member 29 with respect to the center line of the holder 20. The combined longitudinal and rotational adjustment capabilities of the present invention are generally sufficient to overcome mechanical tolerance misalignment in optical systems.

In assembly of the fiber in the holder, the fiber 31 is flush mounted to the end disc 30 and second end disc 37, and is secured by bonding thereto. In turn the two end discs 30, 37 are bonded respectively to the distal end of tubular member 29 and to a spacer 36. The position of the fiber end in the disc 30, relative to the position of the other end disc 37, is then adjusted as described, both radialy and longitudinally, until final alignment is achieved. As a last step, the spacer 36 is bonded to the tubular member 29 after final adjustments have been made.

Thus there has been disclosed in adjustable fiber optic holder which provides for both longitudinal and radial adjustment capabilities. The holder may be utilized to compensate for mechanical misalignments encountered in optical systems in order to accomplish the focusing of light energy onto the end of an optical fiber.

It is to be understood that the above-described embodiments are merely illustrative of some of the many specific embodiments which represent applications of the principles of the present invention. Clearly, numerous and varied other arrangements may readily be devised by those skilled in the art without departing from the spirit and scope of the invention.

What is claimed is:

1. An adjustable fiber optic holder comprising:
   a hollow elongated tubular member for holding an optical fiber and having an end disc for mounting one end of the optical fiber in a position radially offset from the axis of the member;
   a second member having an opening offset from its longitudinal axis for receiving the tubular member therein, the tubular member being axially slidable within said opening;
   a housing for encasing the second member while permitting relative rotational movement thereof;
   means for fixing the position of the other end of the optical fiber relative to the tubular member;
   first locking means for locking the tubular member in an assumed position relative to the second member; and
   second locking means for locking the second member in an assumed position relative to the housing.

2. The device of claim 1 wherein the tubular member is rotatable, when released, to permit the positioning of the first end of the optical fiber at any point on a circle of constant radius centered on the axis of the tubular member.

3. The device of claim 2 wherein the tubular member is slidable relative to the second member to permit the axial displacement of the optical fiber to a selected position relative to the second member and the housing.

4. The device of claim 2 wherein the second member is rotatable, when released, to adjust the axis of the tubular member to any point on a circle extending about the center of the second member.

5. The device of claim 4 wherein the eccentric displacement of the optical fiber end in the end disc relative to the axis of the tubular member is equal to the eccentric displacement of the axis of the tubular member relative to the axis of the second member.

6. The device of claim 5 wherein the combined rotational adjustment of the tubular member and of the second member are such that the optical fiber end can be located at any point within a circle having a radius equal to twice the eccentric displacement of the fiber end relative to the tubular member axis.

7. The device of claim 1 wherein the first locking means includes means for locking the tubular member against movement relative to the second member both longitudinally and rotationally.

8. The device of claim 7 wherein the first locking means comprises a plurality of resilient fingers extending from the second member toward the tubular member, and a tapered nut threadable on the second member to force the resilient fingers against the tubular member.

9. The device of claim 1 wherein the means for mounting the other end of the optical fiber includes a flush mounting, apertured disc for retaining the optical fiber in a coaxial position relative to the axis of the tubular member.

10. The device of claim 9 wherein said mounting means further includes a spacer extending between the apertured disc and the tubular member for fixing the apertured disc and the other end of the fiber in a selected position relative to the tubular member.

11. The device of claim 1 wherein the second locking means includes a jam nut for locking the second member against rotation relative to the housing.

12. An adjustable holder for securing an optical fiber comprising:
- an end disc having an eccentric hole therein for receiving one end of the fiber;
- a tubular member having said end disc disposed in one end thereof;
- a threaded collet having an eccentric hole disposed therein into which said tubular member is slidably disposed; and
- a tapered nut adapted to thread onto said threaded collet to secure said tubular member in a selected one of a plurality of variable positions relative to said collet.

13. An adjustable fiber optic holder which provides for both longitudinal and radial adjustment of a length of optical fiber disposed therein, said holder comprising:
- an end disc having an eccentric hole disposed therein into which is disposed one end of said optical fiber;
- a tubular member having said end disc disposed in one end thereof and said optical fiber extending therethrough;
- a threaded collet having an eccentric opening disposed therein into which said tubular member is slidably mounted;
- a tapered nut threaded onto said collet and adapted to secure said tubular member in a fixed position relative to said collet; and
- a housing for rotatably mounting the collet;
- whereby relative rotational motion between said tubular member and said collet and between the collet and said housing provides for radial adjustment of said fiber end because of the relative eccentricities of holes in said collet and said end disc, and whereby relative longitudinal motion of said tubular member with respect to said collet and said tapered nut provides for longitudinal adjustment of the fiber.

14. An adjustable fiber optic holder for use with an optical system which focuses light energy onto an end of an optical fiber wherein the position of said fiber must be adjusted to receive the focused energy, said holder comprising:
- an end disc having an eccentric hole therein into which is disposed said one end of the fiber;
- a tubular member having said end disc disposed in one end thereof and having the fiber extending therethrough;
- a threaded collet having an eccentric hole disposed therein into which said tubular member is slidably and rotatably mounted;
- a tapered nut threadable onto said collet for securing the tubular member in a fixed position, both rotationally and longitudinally, relative to said collet;
- a housing for rotatably mounting the collet; and
- a jam nut for locking the collet against rotation relative to the housing.

15. The holder of claims 12, 13 or 14 wherein said tubular member further comprises a second end disc having a hole disposed therein for mounting the other end of the fiber.

16. An adjustable fiber optic holder comprising:
- a hollow elongated tubular member for holding an optical fiber flush mounted with the end thereof in a position radially offset from the axis of the tubular member;
- a second member having an opening offset from its longitudinal axis for receiving the tubular member therein, the tubular member being axially slidable within said opening;
- a housing for encasing the second member while permitting relative rotational movement thereof;
- first releasable locking means for locking the tubular member in a selected one of a plurality of positions axially related to the second member; and
- second releasable locking means for locking the second member in an assumed position relative to the housing.

17. The device of claim 16 wherein said tubular member is selectively rotatable in said second member when said first locking means is in an unlocked position.

18. A method of mounting an optical fiber for adjustable positioning relative to a housing comprising the steps of:
- flush mounting a first end of the fiber in an eccentrically located opening in the end of a tubular member;
- slidably mounting the tubular member in an eccentrically located opening in a second member which is rotatable relative to a housing;
- rotating the tubular member relative to the second member and the second member relative to the housing to position the first end of the fiber at a selected location within a circle of radius exceeding the eccentric displacement of either the tubular member opening from the axis of the tubular member or the second member opening from the axis of the second member taken individually;
- adjusting the longitudinal position of the tubular member relative to the second member; and
- locking the tubular member against movement relative to the second member.

19. The method of claim 18 further including the step of affixing the other end of the optical fiber in a selected position relative to the tubular member for movement therewith.

20. The method of claim 19 wherein the affixing step includes positioning the other end of the optical fiber on the axis of the tubular member.

21. The method of claim 18 further including the step of locking the second member against movement relative to the housing.

* * * * *